United States Patent [19]
Horigome

[11] Patent Number: 4,588,278
[45] Date of Patent: May 13, 1986

[54] LENS DRIVING DEVICE OF AN AUTO-FOCUS SYSTEM

[75] Inventor: Hirofumi Horigome, Kawasaki, Japan

[73] Assignee: Ricoh Company, Ltd., Tokyo, Japan

[21] Appl. No.: 462,041

[22] Filed: Jan. 28, 1983

[30] Foreign Application Priority Data

Jan. 30, 1982 [JP] Japan .................................. 57-13713

[51] Int. Cl.⁴ .......................................... G03B 3/10
[52] U.S. Cl. ................................ 354/406; 354/409
[58] Field of Search ............... 354/406, 400, 402, 405, 354/407, 409

[56] References Cited

U.S. PATENT DOCUMENTS 4,126,870 11/1978 Kondo ................................. 354/406
4,303,321 12/1981 Enomoto et al. .................... 354/406
4,307,947 12/1981 Jyoiyiki .............................. 354/406
4,336,987 6/1982 Shenk ................................. 354/409
4,352,545 10/1982 Uno et al. .......................... 354/406

Primary Examiner—L. T. Hix
Assistant Examiner—David M. Gray
Attorney, Agent, or Firm—Oblon, Fisher, Spivak, McClelland & Maier

[57] ABSTRACT

A device for driving to move a focusing lens of an auto-focus system depending upon the current focus condition for use in a camera and the like includes an focusing lens driving processing circuit interposed between an arithmetic processing circuit, which receives distance information to an object of interest, and an indicator/controller. The driving processing circuit allows to maintain the detected in-focus condition sufficiently long so that the lens is prevented from executing unnecessary reciprocating movement and stability in operation is insured even if the object is in slight motion, or the camera is being held by hands.

6 Claims, 9 Drawing Figures

LENS DRIVING DEVICE OF AN AUTO-FOCUS SYSTEM

BACKGROUND OF THE INVENTION

1. Field of the Invention

This invention relates to a device for driving to move a focusing lens forward or backword depending upon the focus condition, i.e., whether it is too close, in-focus or too far, and, in particular, it relates to a lens driving device of an auto-focus system for use in a still camera, cinematographic camera (8 mm, 16 mm, etc.), video camera and the like to move the focusing lens into the in-focus condition.

2. Description of the Prior Art

In general, in an auto-focus system, a distance to an object is measured, and the thus obtained distance information is processed to determine whether it is too close, in-focus or too far, on the basis of which the current focus condition is indicated in an indicator and the position of the focusing lens is controlled (forward movement, no movement or backward movement). And, this series of steps is repetitively carried out.

FIG. 1 schematically shows a distance measuring system when applied to a single reflex camera. As shown, a quick return mirror or main mirror 1 is provided with a sub-mirror 2 which reflects the light coming through the main mirror 1 toward the bottom portion of a mirror box, where a beam splitter 3 is located, as shown in FIG. 2. Below the beam splitter 3 is defined a focusing reference surface F′ which is located optically equidistantly as a film surface F with respect to the main mirror 2. Provided as attached to the beam splitter 3 is a pair of solid-state image sensors $S_1$ and $S_2$, each comprised of a charge coupled device (CCD) having a train of sensing elements. The CCDs $S_1$ and $S_2$ are optically located on both sides of and equidistantly from the focusing reference surface F′. These CCDs $S_1$ and $S_2$ scan the illumination distribution of an object of interest and the sensed values between the corresponding sensing elements are then compared to produce a contrast evaluation function.

By changing the position of the lens with respect to the film surface F, or the focusing condition, a contrast curve $C_1$ is obtained from the image sensor $S_1$, which is located closer to the mirror 2 and thus the focusing lens with respect to the focusing reference surface F′ or film surface F, and the thus obtained contrast curve is graphically shown in FIG. 3(a). Similarly, a contrast curve $C_2$ may be obtained from the other image sensor $S_2$, and this curve is also shown in FIG. 3(a). Since the image sensors $S_1$ and $S_2$ are located in front of (too close side) and aft of (too far side) the focusing reference surface F′, respectively, the curves $C_1$ and $C_2$ are out of phase, as shown in FIG. 3(a). Since the image sensors $S_1$ and $S_2$ are equidistantly located from the focusing reference surface F′, if the focusing lens, initially in the too close region, is moved toward the too far region, the contrast value $C_1$ obtained from the image sensor $S_1$ gradually increases to reach its maximum and then starts to go down. On the other hand, the contrast value $C_2$ obtained from the image sensor $S_2$ also gradually increases and it reaches its maximum after the contrast curve $C_1$ having already passed its own maximum. Thereafter, the contrast curve $C_2$ also goes down.

Under the circumstances, the merging point between the two curves $C_1$ and $C_2$, which is a midpoint between the respective maximum points, indicates that the object of interest is sharply focused on the film surface F. On the other hand, the condition of $C_1$ greater than $C_2$ indicates the too close condition and the condition of $C_1$ smaller than $C_2$ indicates the too far condition. Thus, in order to determine such a focusing condition, a differential curve $C_3$ is obtained by taking a difference between the contrast curves $C_1$ and $C_2$, as shown in FIG. 3(c), and by comparing the thus obtained differential curve $C_3$ with predetermined threshold levels $T_1$ (positive) and $T_2$ (negative), it is determined to be in focus if the value of $C_3$ is in the range between $T_1$ and $T_2$, or nearly equal to zero; on the other hand, it is determined to be too close, if $C_3$ is above $T_1$, and it is determined to be too far, if $C_3$ is below $T_2$. The regions indicated as "BEYOND RANGE" in FIG. 3(a) cannot be used because the contrast level is extremely low in these regions. It is true that the differential curve $C_3$ approaches zero also in these regions; however, this condition is secluded from the in-focus condition by watching the behavior of the two contrast curves $C_1$ and $C_2$.

FIG. 3(b) schematically shows an example of the indicator for indicating the current focusing condition, whether it is too close, in-focus or too far, from left to right, and such an indicator may be provided in a viewfinder of a camera. In FIGS. 2 and 3, the distance between the film surface F and the detecting surface of each of the image sensors $S_1$ and $S_2$ is denoted by 1. The focusing condition thus determined is then indicated in a separate indicator or the viewfinder, and the operator may move the focusing lens either toward or away from the film surface depending upon the current focusing condition to bring the lens into the in-focus position. Alternatively, in the case where an automatic lens moving mechanism is provided, such a detected signal may be used to bring the lens into the required in-focus position automatically.

FIG. 4 shows in block diagram a typical prior art detection/control mechanism in an auto-focus system, and it includes a light receiving section 4 comprised of such elements as image sensors $S_1$ and $S_2$, an arithmetic processing circuit 5 for producing the contrast curves $C_1$ and $C_2$ on the basis of the distance information detected by the light receiving section 4 to compare the difference between the two curves $C_1$ and $C_2$ with predetermined threshold levels $T_1$ and $T_2$ to determine the current focusing condition to be too close, in focus or too far and an indication/control section 6 for indicating the current focusing condition or controlling the movement of the focusing lens in response to a signal supplied from the arithmetic processing circuit 5. The operation of the mechanism shown in FIG. 4 includes a series of a light receiving (distance measuring) step, an arithmetic processing (determination of the current focusing condition step and an indicating and controlling step, and such a series of steps is carried out in repetition.

The focusing accuracy of the structure shown in FIG. 4 may be enhanced by setting the threshold levels substantially closer to zero. In such a case, however, the focusing condition indicator rapidly changes its indicated state, in focus or out of focus, for example, when the camera is held by the operator's hands or the object of interest is in motion. If this happens, it is very difficult to properly judge the current focusing condition. Moreover, the focusing lens is driven to move quickly forward and backward in a reciprocating manner, and a motor for driving to move the focusing lens is set in vibration, thereby causing unstability in operation. And, from a practical viewpoint, it is not always required to obtain the highest accuracy, though it is better to have a possible highest accuracy at all times. On the other hand, the threshold levels $T_1$ and $T_2$ may be set larger in absolute value so as to allow to judge the current focusing condition easily, but, in this case, the focusing accuracy becomes lowered and unsatisfactory.

SUMMARY OF THE INVENTION

The disadvantages of the prior art are overcome with the present invention and an improved focusing condition indicating device is provided. In accordance with the present invention, there is provided a device for driving to move a focusing lens depending upon the current focus condition of an auto-focus system, said device comprising: means for measuring a distance to an object of interest; first processing means for processing the measured distance successively to determine the focus condition corresponding to the measured distance, said focus condition being either one of too close, in-focus and too far conditions; storing means for storing a first predetermined number of the focus conditions determined by said first processing means; second processing means for processing the thus stored first predetermined number of focus conditions to produce an in-focus indication signal only when said first predetermined number of focus conditions are found to include at least a second predetermined number of in-focus conditions; and lens driving means connected to said first and second processing means for driving to move said lens depending upon the current focusing condition, said driving means stopping to move said lens in response to said in-focus indication signal supplied from said second processing means irrespective of the focus condition of the last one of said first predetermined number of focus conditions.

Therefore, it is a primary object of the present invention to provide an improved device for driving to move a focusing lens depending upon the current focusing condition in an auto-focus system.

Another object of the present invention is to provide a device for driving to move a focusing lens of an auto-focus system, which is free of chattering and stable in operation.

A further object of the present invention is to provide a device for driving to move a focusing lens depending upon the current focusing condition in an auto-focus system which is much easier to use as compared with the prior art devices and yet high in accuracy.

A still further object of the present invention is to provide a focusing lens driving device which is relatively simple in structure and thus easy to make.

Other objects, advantages and novel features of the present invention will become apparent from the following detailed description of the invention when considered in conjunction with the accompanying drawings.

DESCRIPTION OF THE PREFERRED EMBODIMENTS

Figure 1:
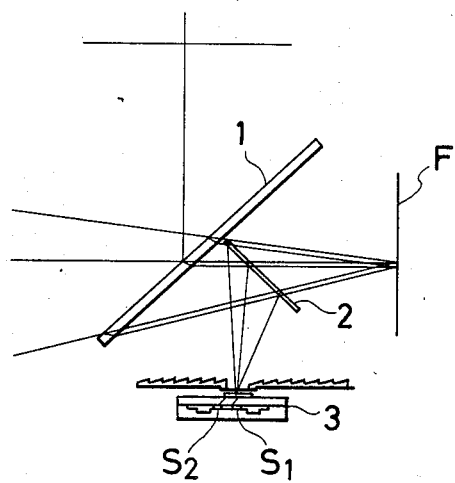
FIG. 1 is a schematic illustration showing the structure of a typical auto-focus system to which the present invention may be applied.
Figure 2:
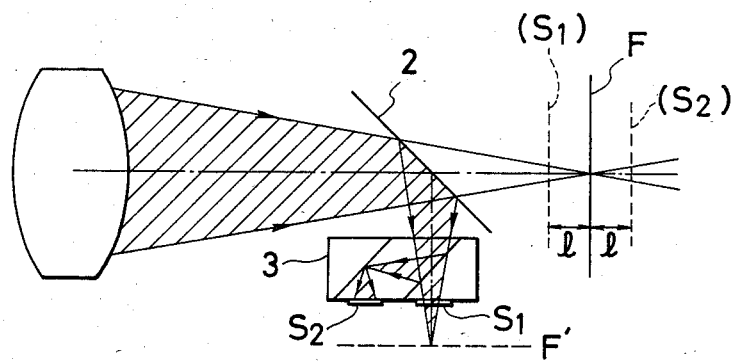
FIG. 2 is a schematic illustration showing on an enlarged scale the main components of the structure shown in FIG. 1.
Figure 3A:
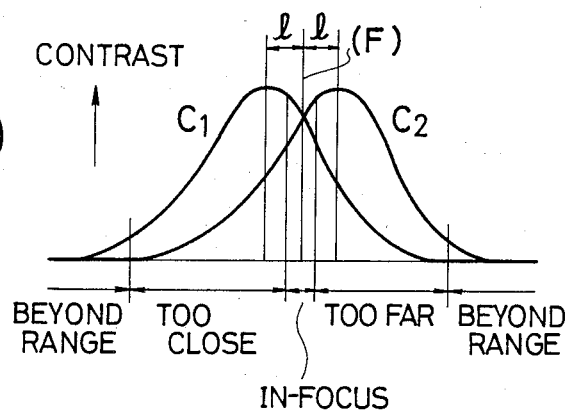
FIGS. 3 (a)-(c) are useful for understanding the operation of the system shown in FIGS. 1 and 2, in which FIGS. 3 (a) and (c) are graphs indicating the characteristics of the pair of image sensors $S_1$ and $S_2$
FIG. 3(b) is a schematic illustration showing one example of the focusing condition indicator, indicating too close, in focus and too far from left to right.
Figure 3B:
Figure 3C:
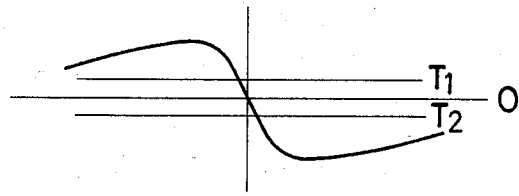
Figure 4:
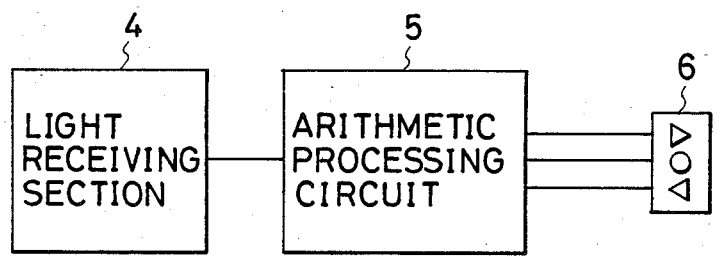
FIG. 4 is a block diagram showing the prior art device.
Figure 5:
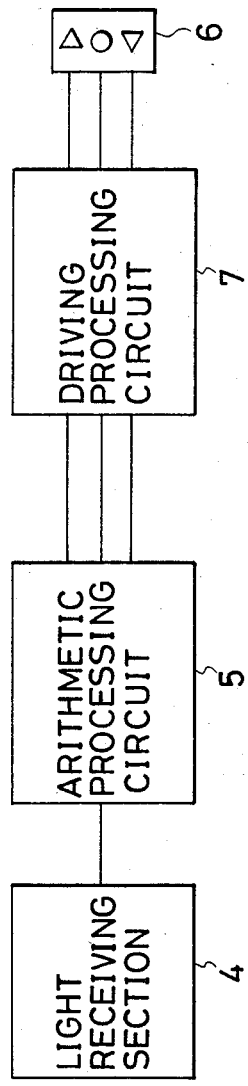
FIG. 5 is a block diagram showing the basic structure of a focusing lens driving device embodying the present invention.

Referring now to FIG. 5, showing in block diagram the basic structure of one embodiment of the present invention, the focusing condition indicating device includes a light receiving section 4, comprised of elements such as image sensors $S_1$ and $S_2$ shown in FIGS. 1 and 2, for detecting the distance to an object of interest, an arithmetic processing circuit 5 for processing the distance information thus detected by the image sensors to obtain a current focusing condition data, a driving processing circuit 7 for storing and processing the focusing condition data over a predetermined number of cyclic operations, and an indicator/controller section 6, which indicates the focusing condition and/or controls the position of the focusing lens. In the present structure of FIG. 5, the driving processing circuit 7 is additionally provided as interposed between the arithmetic processing circuit 5 and the indicator/controller section 6 as compared with the prior art structure of FIG. 4.

The driving processing circuit 7 is so structured to store n−1 number of focusing condition data supplied from the arithmetic processing circuit 5, which processes the distance information supplied from the image sensors in repetition and to determine the number of the in-focus condition data among the n−1 number of the stored focusing condition data plus the currently supplied focusing condition data from the arithmetic processing circuit 5, whereby, if the number of the in-focus condition data has been found to be m or more, subjected to the condition that m is smaller than n, then an in-focus signal is supplied to the section 6 to have it indicate the in-focus condition; on the other hand, if the number of the in-focus condition data has been found to be less than m, then the currently supplied focusing condition data, i.e., the final data in the nth arithmetic processing operation, is supplied to the section 6 to have it indicate the focusing condition of the final data.

For example, for n=3 and m=1, the driving processing circuit 7 stores the focusing condition data for the last two cycles of arithmetic processing operations, and if at least one in-focus condition data is found among the stored data plus the current data supplied from the arithmetic processing circuit 5, an in-focus signal is supplied to the indicator/controller section 6 thereby causing it to indicate the in-focus condition and to stop driving to move the focusing lens. On the other hand, if absence of in-focus condition data is found, then the current data, whether too close or too far, is supplied to the section 6 thereby causing it to move the lens forward or backward. As a result, if one out of three cycles of the arithmetic processing operation has detected the existence of in-focus condition, the present indicating device indicates the in-focus state and stops driving of the lens movement. Accordingly, the out-of-focus condition data for this period are neglected.

Figure 6:
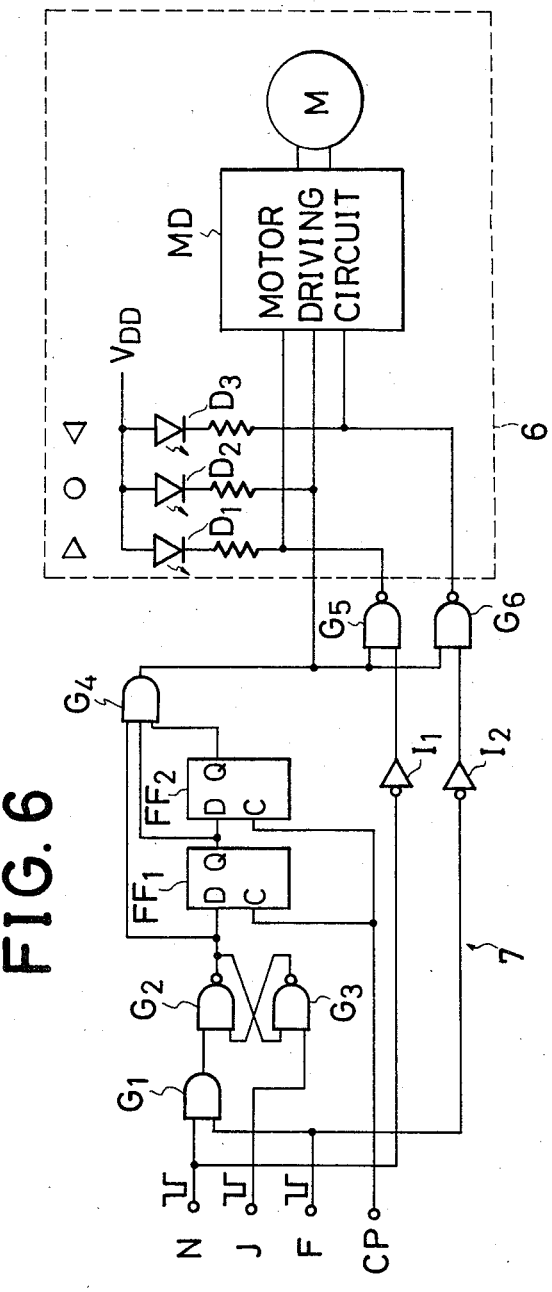
FIG. 6 is a circuit diagram partly in blocks and partly in logic symbols showing one embodiment of the present invention.

FIG. 6 shows one embodiment of the present indicating device, and it includes four input terminals N, J, F and CP, all of which are connected to receive "too close", "in focus", "too far" and "clock pulse" signals, respectively, as supplied from the arithmetic processing circuit 5. As shown in FIG. 6, the too close, in focus and too far signals are indicated as low level signals. The device includes an AND gate $G_1$ having one input connected from the terminal N and the other input connected from the terminal F. Also provided in the device is a pair of cross-coupled NAND gates $G_2$ and $G_3$. The remaining input of the NAND gate $G_2$ is connected from the output of the AND gate $G_1$, and the remaining input of the NAND gate $G_3$ is connected from the terminal J. The output of the cross-coupled NAND gates $G_2$ and $G_3$ is connected to the D input of a flipflop $FF_1$, whose C input is connected from the terminal CP. Another flipflop $FF_2$ is so provided to have its D input connected from the Q output of the flipflop $FF_1$ and its C input connected from the CP terminal. An AND gate $G_4$ has its first input connected from the output of the cross-coupled NAND gates $G_2$ and $G_3$, second input connected from the Q output of the flipflop $FF_1$ and third input connected from the Q output of the flipflop $FF_2$. The output of the AND gate $G_4$ is connected to one input of each of NAND gates $G_5$ and $G_6$, whoses the other inputs are connected from the terminals N and F through inverters $I_1$ and $I_2$, respectively.

As shown, the indicator/controller section 6 includes three light emitting diodes $D_1$, $D_2$ and $D_3$, whose anodes are commonly connected to a voltage source $V_{DD}$. The output of the AND gate $G_4$ is also connected to the cathode of the LED $D_2$ through a current limiting resistor; whereas, the outputs of the NAND gates $G_5$ and $G_6$ are connected to the cathodes of the LEDs $D_1$ and $D_3$, respectively, through current limiting resistors. When one of the gates $G_4$ through $G_6$ supplies a low level signal as its output, the corresponding LED in the indicator section 6 is lit to indicate the current focusing condition, i.e., too close, in focus or too far. Also provided as connected to the outputs of the AND gate $G_4$ and the NAND gates $G_5$ and $G_6$ is a motor driving circuit MD, which is also connected to a motor M as a driving source for driving to move the focusing lens either in the forward or backward direction as required.

Thus, when either one of the outputs from the gates $G_5$ and $G_6$ is low in level, the corresponding one of the LEDs $D_1$ and $D_3$ is lit to indicate the current focus condition, and, at the same time, the motor driving circuit MD is activated to drive to rotate the motor M in a required direction, so that the focusing lens is driven to move either in the forward or backward direction to be brought into the in-focus position. On the other hand, if the gate $G_4$ supplies a low level output signal, the LED $D_2$ is lit to indicate that the current focus condition is in the in-focus condition, and, at the same time, the motor driving circuit MD is deactivated to stop the rotation of the motor M.

Figure 7:
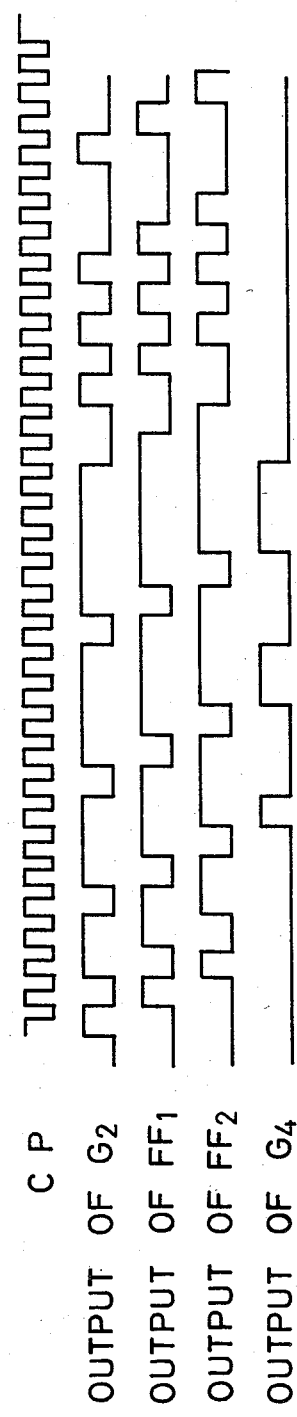
FIG. 7 is a timing chart which is useful for understanding the operation of the device shown in FIG. 6.

With the above-described structure, since the outputs of the three flipflops $G_2$-$G_3$, $FF_1$ and $FF_2$ are connected to three inputs of the AND gate $G_4$, if at least one in-focus condition data exists over the three consecutive data, i.e., two data stored in the flipflops $FF_1$ and $FF_2$ and one data present in the flipflop $G_2$-$G_3$, the AND gate $G_4$ supplies a low level output, and, thus, the LED $D_2$ is lit to indicate the existence of the in-focus condition and to stop the motor M through the motor driving circuit MD. On the other hand, in the case of absence of in-focus condition data in any of the three flipflops, the currently existing out-of-focus condition data, too close or too far, is supplied to the corresponding one of the two LEDs $D_1$ and $D_3$ through the respective inverters $I_1$, $I_2$ and NAND gates $G_5$, $G_6$, and also to the motor driving circuit MD to cause the motor M driven to rotate, thereby moving the focusing lens forward or backward to be located at the in-focus position. Such an operation will become further clearer when reference is made to the time chart of FIG. 7 which shows the clock pulse CP and the outputs of the gate $G_2$, flipflops $FF_1$ and $FF_2$ and the gate $G_4$.

In this manner, in accordance with the present invention, it is so structured that the in-focus condition is assumed as long as the frequency of the detected in-focus conditions is more than a predetermined value. As a result, the motor is prevented from being driven to rotate unnecessarily and the focusing lens is prevented from being driven to move unnecessarily due to fluctuating components such as slight movement of an object of interest as long as the object remains in a predetermined in-focus range, which may be practically treated as the in-focus condition. On the other hand, if it is, in fact, out of focus, since the likelihood of producing an in-focus signal is very low, the indicator does not indicate the in-focus condition, and the focusing lens will be driven to move forward or backward depending upon the current focusing condition.

While the above provides a full and complete disclosure of the preferred embodiments of the present invention, various modifications, alternate constructions and equivalents may be employed without departing from the true spirit and scope of the invention. Therefore, the above description and illustration should no be construed as limiting the scope of the invention, which is defined by the appended claims.

What is claimed is:

1. A device for driving to move a focusing lens of an auto-focus system depending upon the current focus condition, said device comprising:
    means for measuring a distance to an object of interest;
    first processing means for processing the measured distance successively to determine the focus condition corresponding to the measured distance, said focus condition being either one of too close, in-focus and too far conditions;
    storing means for storing a first predetermined number of the focus conditions successively determined by said first processing means;
    second processing means for processing the thus stored first predetermined number of focus conditions to produce an in-focus indication signal only when said first predetermined number of focus conditions is found to include at least a second predetermined number of in-focus conditions; and
    lens driving means connected to said first and second processing means for driving to move said lens depending upon the current focusing condition, said driving means stopping to move said lens in response to said in-focus indication signal supplied from said second processing means irrespective of the focus condition of the last one of said first predetermined number of focus conditions.

2. A device of claim 1 wherein said storing means includes a plurality of flip-flops connected in series, said plurality corresponding in number to a sum of said first predetermined number and one, whereby a clock pulse is supplied to transfer the data from one to the next one.

3. A device of claim 2 wherein said plurality of flip-flops include an input flip-flop which stores the latest data supplied from said first processing means.

4. A device of claim 2 wherein said second processing means includes an AND gate having a plurality of inputs each of which is connected from the output of each of the corresponding flipflops.

5. A device of claim 4 wherein said lens driving means includes first, second and third indicators, said first and third indicators being connected to receive too close and too far signals supplied from said first processing means and said second indicator being connected to the output of said AND gate.

6. A device of claim 5 wherein said first, second and third indicators each comprise a light emitting diode.

* * * * *